US008707043B2

(12) United States Patent
Wason et al.

(10) Patent No.: US 8,707,043 B2
(45) Date of Patent: Apr. 22, 2014

(54) SPLIT TERMINATION OF SECURE COMMUNICATION SESSIONS WITH MUTUAL CERTIFICATE-BASED AUTHENTICATION

(75) Inventors: Prashant Wason, San Francisco, CA (US); Nitin Gupta, Fremont, CA (US); Robert Adler, San Francisco, CA (US)

(73) Assignee: Riverbed Technology, Inc., San Francisco, CA (US)

( * ) Notice: Subject to any disclaimer, the term of this patent is extended or adjusted under 35 U.S.C. 154(b) by 848 days.

(21) Appl. No.: 12/396,904

(22) Filed: Mar. 3, 2009

(65) Prior Publication Data
US 2010/0228968 A1 Sep. 9, 2010

(51) Int. Cl.
*H04L 9/32* (2006.01)
(52) U.S. Cl.
USPC ........... 713/171; 713/153; 713/172; 713/173; 380/229; 709/225; 709/226
(58) Field of Classification Search
USPC ................ 726/10, 12, 18; 713/153, 156, 169, 713/171–173; 709/203, 227, 229, 237, 709/225–226; 380/229
See application file for complete search history.

(56) References Cited

U.S. PATENT DOCUMENTS

| 6,094,485 | A  | 7/2000  | Weinstein et al. |
| 6,104,716 | A  | 8/2000  | Crichton et al.  |
| 6,105,067 | A  | 8/2000  | Batra            |
| 6,526,131 | B1 | 2/2003  | Zimmerman et al. |
| 6,584,567 | B1 | 6/2003  | Bellwood et al.  |
| 6,643,701 | B1 | 11/2003 | Aziz et al.      |
| 6,658,114 | B1 | 12/2003 | Farn et al.      |
| 6,681,327 | B1 | 1/2004  | Jardin           |
| 6,704,798 | B1 | 3/2004  | Mogul            |

(Continued)

FOREIGN PATENT DOCUMENTS

| EP | 1533982 A2 | 5/2005 |
| WO | 0103398 A2 | 1/2001 |

(Continued)

OTHER PUBLICATIONS

Dierks et al., "The Transport Layer Security (TLS) Protocol Version 1.2", Network Working Group Request for Comments: 5246 (Aug. 2008).

(Continued)

*Primary Examiner* — Taghi Arani
*Assistant Examiner* — Roderick Tolentino
(74) *Attorney, Agent, or Firm* — Park, Vaughan, Fleming & Dowler LLP (57) ABSTRACT

A method and apparatus are provided for split-terminating a secure client-server communication connection when the client and server perform mutual authentication by exchanging certificates, such as within a Lotus Notes environment. When the client submits a certificate to the server, an intermediary device intercepts the certificate and submits to the server a substitute client certificate generated by that intermediary. A certificate authority's private key is previously installed on the intermediary to enable it to generate public keys, private keys and digital certificates. With the private key corresponding to the substitute certificate, the intermediary extracts a temporary key from a subsequent server message. The intermediary uses the temporary key to read a session key issued later by the server. Thereafter, the intermediary shares the session key with another intermediary, and together they use the session keys to access and optimize (e.g., accelerate) messages sent by the client and the server.

18 Claims, 4 Drawing Sheets

(56) References Cited

U.S. PATENT DOCUMENTS

| | | | |
|---|---|---|---|
| 6,728,884 B1 | 4/2004 | Lim | |
| 6,799,270 B1 | 9/2004 | Bull et al. | |
| 6,918,041 B1 | 7/2005 | Chen | |
| 6,996,841 B2 | 2/2006 | Kadyk et al. | |
| 7,007,163 B2 | 2/2006 | Tardo et al. | |
| 7,010,608 B2 | 3/2006 | Garg et al. | |
| 7,073,066 B1* | 7/2006 | Nessett | 713/181 |
| 7,082,535 B1 | 7/2006 | Norman et al. | |
| 7,120,666 B2 | 10/2006 | McCanne et al. | |
| 7,146,505 B1 | 12/2006 | Harada et al. | |
| 7,174,565 B2 | 2/2007 | Kadyk et al. | |
| 7,219,120 B2 | 5/2007 | Hui | |
| 7,240,366 B2* | 7/2007 | Buch et al. | 726/14 |
| 7,343,398 B1 | 3/2008 | Lownsbrough | |
| 7,370,351 B1 | 5/2008 | Ramachandran et al. | |
| 7,401,159 B1 | 7/2008 | Aviani et al. | |
| 7,421,735 B2 | 9/2008 | Kerstens et al. | |
| 7,502,726 B2* | 3/2009 | Panasyuk et al. | 703/22 |
| 7,506,369 B2 | 3/2009 | Buch et al. | |
| 7,543,146 B1 | 6/2009 | Karandikar et al. | |
| 7,568,114 B1 | 7/2009 | Schlafly | |
| 7,647,404 B2 | 1/2010 | Cooper et al. | |
| 7,661,131 B1 | 2/2010 | Shaw et al. | |
| 7,770,007 B2 | 8/2010 | Bobde et al. | |
| 7,827,405 B2 | 11/2010 | Christiansen et al. | |
| 7,853,699 B2 | 12/2010 | Wu et al. | |
| 7,865,720 B2 | 1/2011 | Little et al. | |
| 7,895,446 B2 | 2/2011 | Harada et al. | |
| 7,904,949 B2 | 3/2011 | Bowers et al. | |
| 7,958,347 B1 | 6/2011 | Ferguson | |
| 7,979,555 B2 | 7/2011 | Rothstein et al. | |
| 7,984,160 B2 | 7/2011 | Lam | |
| 7,996,886 B1* | 8/2011 | Hughes et al. | 726/6 |
| 8,020,201 B2 | 9/2011 | Adusumilli et al. | |
| 8,176,186 B2 | 5/2012 | McCanne et al. | |
| 8,266,452 B2 | 9/2012 | Dunn et al. | |
| 2001/0047474 A1 | 11/2001 | Takagi et al. | |
| 2002/0016911 A1 | 2/2002 | Chawla et al. | |
| 2002/0023145 A1 | 2/2002 | Orr et al. | |
| 2002/0035681 A1 | 3/2002 | Maturana et al. | |
| 2002/0069241 A1 | 6/2002 | Narlikar et al. | |
| 2002/0157019 A1 | 10/2002 | Kadyk et al. | |
| 2002/0163884 A1 | 11/2002 | Peles et al. | |
| 2002/0165928 A1 | 11/2002 | Landfeldt et al. | |
| 2003/0005280 A1 | 1/2003 | Bobde et al. | |
| 2003/0014628 A1 | 1/2003 | Freed et al. | |
| 2003/0014650 A1 | 1/2003 | Freed et al. | |
| 2003/0105810 A1 | 6/2003 | McCrory et al. | |
| 2003/0196084 A1 | 10/2003 | Okereke et al. | |
| 2003/0200332 A1 | 10/2003 | Gupta et al. | |
| 2003/0233539 A1 | 12/2003 | Tardo et al. | |
| 2004/0010596 A1 | 1/2004 | Hui | |
| 2004/0015725 A1 | 1/2004 | Boneh et al. | |
| 2004/0088542 A1 | 5/2004 | Daude et al. | |
| 2004/0243703 A1 | 12/2004 | Demmer et al. | |
| 2005/0008158 A1 | 1/2005 | Huh et al. | |
| 2005/0021956 A1 | 1/2005 | Genty et al. | |
| 2005/0050316 A1 | 3/2005 | Peles | |
| 2005/0060426 A1 | 3/2005 | Samuels et al. | |
| 2005/0065799 A1 | 3/2005 | Dare et al. | |
| 2005/0081029 A1 | 4/2005 | Thornton et al. | |
| 2005/0108517 A1 | 5/2005 | Dillon et al. | |
| 2005/0138353 A1 | 6/2005 | Spies et al. | |
| 2005/0138359 A1 | 6/2005 | Simon et al. | |
| 2005/0144463 A1 | 6/2005 | Rossebo et al. | |
| 2005/0240777 A1 | 10/2005 | Keohane et al. | |
| 2005/0265327 A1 | 12/2005 | Buch et al. | |
| 2006/0069719 A1 | 3/2006 | McCanne et al. | |
| 2006/0143702 A1 | 6/2006 | Hisada et al. | |
| 2006/0168210 A1 | 7/2006 | Ahonen et al. | |
| 2006/0174106 A1 | 8/2006 | Bell et al. | |
| 2006/0190612 A1 | 8/2006 | Kahol et al. | |
| 2006/0209789 A1 | 9/2006 | Gupta et al. | |
| 2007/0038853 A1 | 2/2007 | Day | |
| 2007/0058807 A1 | 3/2007 | Marsh | |
| 2007/0074282 A1 | 3/2007 | Black et al. | |
| 2007/0199061 A1 | 8/2007 | Byres et al. | |
| 2008/0046714 A1 | 2/2008 | Suganthi et al. | |
| 2008/0060055 A1* | 3/2008 | Lau | 726/3 |
| 2008/0077982 A1 | 3/2008 | Hayler et al. | |
| 2008/0115200 A1 | 5/2008 | Olson et al. | |
| 2008/0126794 A1* | 5/2008 | Wang et al. | 713/151 |
| 2008/0126801 A1 | 5/2008 | Lee et al. | |
| 2008/0263215 A1 | 10/2008 | Schnellbaecher | |
| 2008/0307219 A1 | 12/2008 | Karandikar | |
| 2009/0013399 A1 | 1/2009 | Cottrell et al. | |
| 2009/0083537 A1 | 3/2009 | Larsen et al. | |
| 2009/0083538 A1 | 3/2009 | Merugu et al. | |
| 2009/0089862 A1 | 4/2009 | Sun | |
| 2009/0113537 A1 | 4/2009 | Woo | |
| 2009/0119504 A1 | 5/2009 | Van Os et al. | |
| 2009/0220080 A1 | 9/2009 | Herne et al. | |
| 2010/0031337 A1 | 2/2010 | Black et al. | |
| 2010/0049970 A1 | 2/2010 | Fraleigh et al. | |
| 2010/0071048 A1 | 3/2010 | Novak et al. | |

FOREIGN PATENT DOCUMENTS

| | | |
|---|---|---|
| WO | 0137068 A2 | 5/2001 |
| WO | WO2005001660 | 1/2005 |
| WO | 2005060202 A1 | 6/2005 |

OTHER PUBLICATIONS

Larsen, Case Thomas et al., "Server Configuration Selection for SSL Interception", U.S. Appl. No. 11/489,414.

Tschalar, Ronald et al., "NTLM Authentication Scheme for HTTP", Jun. 17, 2003, http://www.innovation.ch/personal/ronald/ntlm.html, pp. 1-5, downloaded Jan. 20, 2009.

"Kerberos: The Network Authentication Protocol", http://web.mit.edu/Kerberos/, pp. 1-3, downloaded Jan. 20, 2009.

"Microsoft NTLM", http://msdn.microsoft.com/en-us/library/aa378749.aspx, pp. 1-2, downloaded Jan. 20, 2009.

"NTLM", http://en.wikipedia.org/wiki/NTLM, pp. 1-5, downloaded Jan. 20, 2009.

"Kerberos (protocol)", http://en.wikipedia.org/wiki/Kerberos_(protocol), pp. 1-5, downloaded Jan. 20, 2009.

"The Industry Insiders", http://blogs.technet.com/industry_insiders/articles/407751.aspx, downloaded Jan. 20, 2009.

Christensen, Jesper M, "Kerberos in a Sharepoint Environment", Jul. 30, 2008, http://www.windowsecurity.com/articles/Kerberos-Sharepoint-Environment.html, pp. 1-13, downloaded Jan. 20, 2009.

"The NTLM Authentication Protocol and Security Support Provider", http://davenport.sourceforge.net/ntlm.html, pp. 1-93, downloaded Jan. 21, 2009.

"Integrated Windows Authentication (IIS 6.0)", http://microsoft.com/technet/prodtechnol/WindowsServer2003/Library/IIS/523ae943-5e6a-4200-9103-9808baa00157.mspx?mfr=true, pp. 1-2, downloaded Jan. 21, 2009.

* cited by examiner

Authentication Process 200

FIG. 3

FIG. 4

SPLIT TERMINATION OF SECURE COMMUNICATION SESSIONS WITH MUTUAL CERTIFICATE-BASED AUTHENTICATION

FIELD

The present invention relates to network optimization, and in particular to accelerating network transactions conducted during secure communication sessions in which communicants are mutually authenticated using certificates.

BACKGROUND

Protocols that use either or both public-key cryptographic techniques and symmetric-key cryptographic techniques are often used to establish secure communications across an untrusted network or other communication link. Typically, public-key cryptography has better security properties but is more expensive computationally than symmetric-key cryptography. Thus, the two types of cryptography may be combined to use public-key techniques to negotiate a symmetric cipher between two entities. The symmetric-key cipher may then be used for bulk data transfer between the entities. Secure Socket Layer (SSL) and Transport Layer Security (TLS) are widely-used examples of secure communication protocols that have this form, as well as IPSec (Internet Protocol Security) when security associations are negotiated using RSA-based (Rivest, Shamir & Adleman) mechanisms for IKE (Internet (or IPsec) Key Exchange).

Secure communication protocols often add a computational cost to each secured connection. For server computers providing many simultaneous secure connections to client computers, the additional computational overhead imposed by secure communication protocols can be significant. To decrease the computational overhead of secure communication protocols for computers providing large numbers of secure connections, there are various devices that specialize in terminating secure connections.

These secure connection termination devices manage the cryptographic and other security related aspects of the connection, thereby relieving server systems providing services to client systems of the additional overhead imposed by the secure connection. One type of secure connection termination device is configured to accelerate network transactions, and hence is often termed a transaction accelerator.

A transaction accelerator such as that described in U.S. Pat. No. 7,120,666 (McCanne) can offer performance improvement for operations across a wide-area network (WAN), but only when the data being communicated is either intelligible (i.e., the transaction accelerator can interpret at least parts of the protocol) or repeating (i.e., identical data crosses the network in identical format). The use of secure communication protocols such as SSL and TLS thus typically frustrates transaction acceleration, because cryptography (by design) renders encrypted data unintelligible and non-repeating.

A method of securing end-to-end communications between a client and a server in which cooperating transaction accelerators are employed is described in U.S. Patent Publication No. US2007/0038853 (application Ser. No. 11/489,414), and involves the use of separate split-terminated secure protocol sessions between a transaction accelerator and the client, and between another transaction accelerator and the server.

However, transaction accelerators generally are not equipped to participate in authentication schemes between a client and a server. Therefore, they cannot perform optimally in computing environments in which a client and a server perform mutual authentication, especially when the authentication is based on digital certificates.

For example, in a client-server application such as Lotus™ Notes by IBM™, a Lotus Notes client and a Lotus Domino server each possess one or more digital certificates issued by certificate authorities. When the client wishes to open a secure communication connection with the server, each sends the other a copy of a certificate issued by a certificate authority that the other trusts.

If the client and the server successfully verify the other's certificate, they then agree upon a session key (e.g., a symmetric encryption/decryption key) and subsequently use that key to secure their communications. Because the key is only shared among the entities that participated in the mutual authentication process, a traditional transaction accelerator or similar entity cannot participate in the resulting client-server communication connection and therefore cannot optimize client-server communications.

A traditional transaction accelerator may attempt to solve this problem by importing client certificates, which would allow it to proxy for those clients and receive session keys for communicating with a server. However, this is an impractical solution because there is likely a vast number of clients, and therefore a large number of certificates would have to be maintained on the transaction accelerator. In addition, because of the ever-changing nature of clients (e.g., new clients appearing for new employees, old clients disappearing as employees depart), such a pool of client certificates would need constant updating.

SUMMARY

A method and apparatus are provided for facilitating split-termination of a secure communication connection between a client computing device and a server computing device, in an environment in which the client and server perform mutual authentication through the exchange of digital certificates.

In some embodiments of the invention, a pair of network intermediaries is situated in a path of communications between the client and the server. A private key of a certificate authority is loaded onto a first intermediary, to enable it to generate public/private key pairs and new digital certificates. The key that is loaded may be from a certificate authority that operates on the server (e.g., a Lotus Domino server). The intermediary that receives the private key may or may not actually operate as a certificate authority.

In these embodiments of the invention, the first intermediary intercepts a client digital certificate transmitted toward the server by the client and, instead of submitting this certificate to the server for authentication, submits to the server a substitute client digital certificate generated by that intermediary or some other intermediary. The substitute certificate may be generated on-the-fly (e.g., when the client digital certificate is intercepted), or may be generated ahead of time (e.g., when the intermediary notices the client is attempting to establish a connection with the server).

After submitting the substitute client digital certificate, the first intermediary intercepts a message sent from the server toward the client, and decrypts it with the private key that corresponds to the substitute certificate. The intermediary extracts a ticket from the message, extricates a temporary key from the ticket, and forwards the ticket to the client after re-encrypting it with the public key from the original client digital certificate.

The temporary key is then used to retrieve a session key from a subsequent message issued by the server toward the client. The session key is shared with the other intermediary, thereby allowing them to read messages sent from the client toward the server and vice versa.

The intermediaries access the client-server messages in order to optimize them before re-encrypting them for transmission over a wide-area network (e.g., the Internet). A Lotus Notes domain is one environment in which embodiments of the invention described herein may be implemented.

In some embodiments of the invention, instead of (or in addition to) installing on an intermediary a private key of a CA that is trusted by a Lotus Notes server, a certificate comprising a public key of the intermediary is installed as a trusted CA on the server. Illustratively, this public key may be generated by the intermediary itself, and is not provided to any entity outside the Notes environment.

DETAILED DESCRIPTION OF ILLUSTRATIVE EMBODIMENTS

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the present invention. Thus, the present invention is not intended to be limited to the embodiments shown, but is to be accorded the widest scope consistent with the principles and features disclosed herein.

In embodiments of the invention described herein, methods are provided for enabling network optimization (e.g., acceleration) of end-to-end secure communication connections. These embodiments are well suited for use with applications such as Lotus™ Notes and Lotus Domino by IBM™, wherein the communicants (e.g., a client and a server) perform mutual certificate-based authentication, and only agree upon a security key (e.g., a symmetric encryption/decryption key) after successful authentication.

In these embodiments, one or more intermediate entities (e.g., transaction accelerators) are positioned within a communication path between the client and the server. At least one of the intermediaries is trusted by the server and is able to insert itself into the authentication process by proxying for the client.

Illustratively, the intermediary may be enhanced with a private cryptographic key issued according to a known PKE scheme to a certificate authority (CA) trusted by the server, which allows it to generate and sign new digital certificates. As one alternative, a trusted relationship may be established between the intermediary and the server by installing a public key of the intermediary on the server to establish it as a trusted CA.

The intermediary intercepts the client's actual digital certificate when submitted to the server for authentication, and may use it to verify the client. In place of the actual client certificate, the intermediary generates and submits a substitute client digital certificate. Because the intermediary possesses the private key corresponding to the substitute digital certificate, it can extract a temporary key sent from the server toward the client in a return message encrypted with the public key of the substitute certificate.

With this key, the intermediary can ultimately obtain the session key issued by the server for the secure client-server communication connection, and share it with the other intermediary. Split-terminated communication sessions are thus established between one intermediary and the client and between the other intermediary and the server. The interposition and operation of the intermediaries within their stream of communications, to optimize the communications, is transparent to the client and the server.

Figure 1:
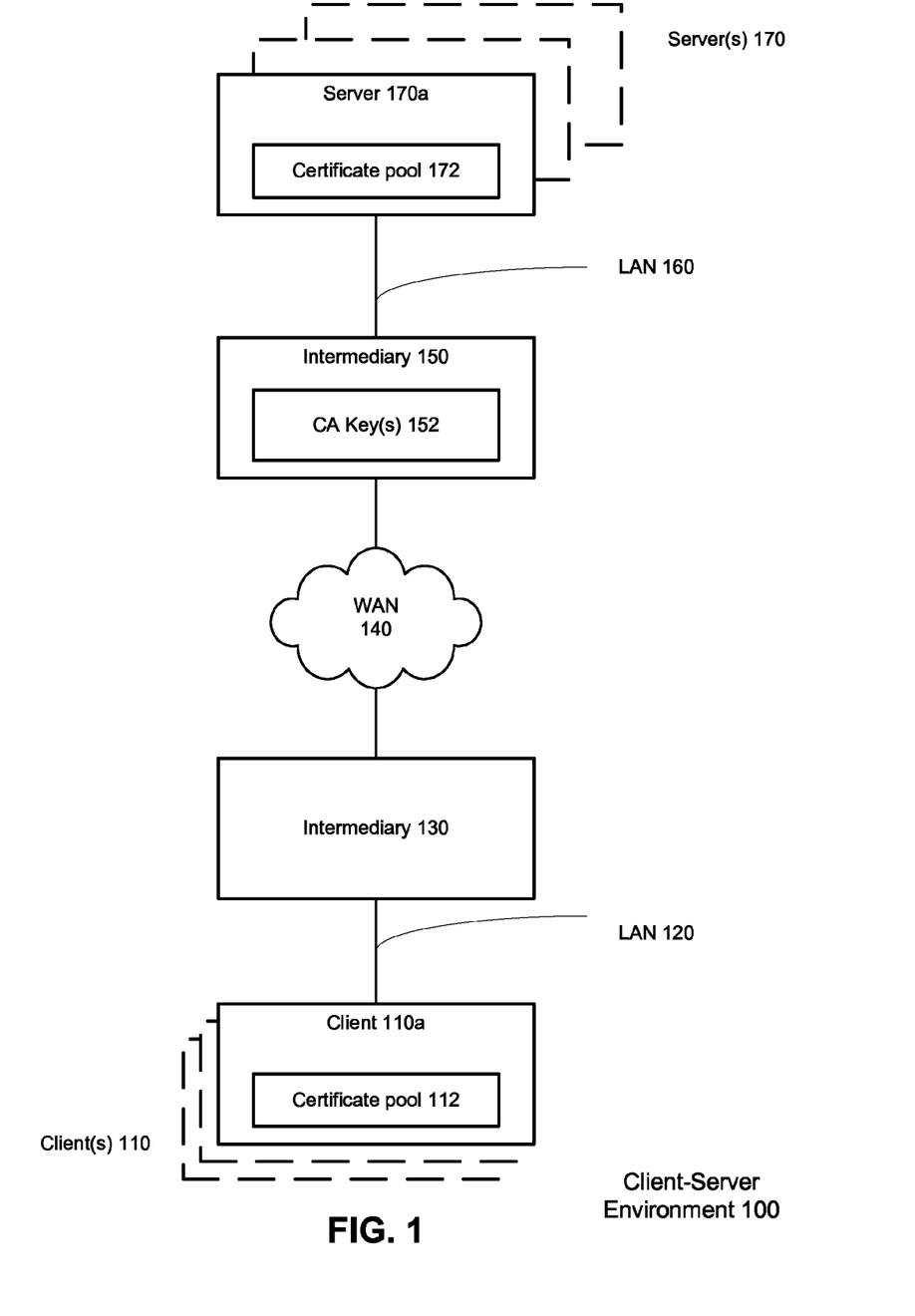
FIG. 1 is a block diagram depicting an environment in which mutually authenticated secure communication protocol sessions may be split-terminated, according to some embodiments of the invention.

FIG. 1 illustrates an environment in which some embodiments of the invention may be implemented. In this environment, clients 110 (e.g., client 110a) communicate with servers 170 (e.g., server 170a) in client-server relationships. Intermediaries 130, 150 are situated in a path of communication between client 110a and server 170a.

Intermediaries 130, 150 are coupled to WAN (Wide Area Network) 140, while client 110a is coupled to intermediary 130 via LAN (Local Area Network) 120 and server 170a is coupled to intermediary 150 via LAN 160. Thus, intermediary 130 is relatively local to client 110a, while intermediary is relatively local to server 170a (e.g., within the same data center).

In the embodiment of FIG. 1, communications traversing WAN 140 are characterized by relatively high latency and low bandwidth in comparison to communications transiting LANs 120, 160. In other embodiments of the invention, other types of communication links may be employed. For example, LAN 120 and/or LAN 160 may be WANs.

Intermediary 130 may be termed a "client side intermediary" (or CSI) and intermediary 150 may be termed a "server side intermediary" (or SSI) to reflect their relative positions within environment 100. Although not shown in FIG. 1, additional client side intermediaries may also cooperate with server side intermediary 150, and/or client side intermediary 130 may cooperate with other server side intermediaries.

In one particular embodiment of the invention, intermediaries 130, 150 are Steelhead™ transaction accelerators from Riverbed® Technology, and are configured to optimize communications and applications (e.g., through compression or acceleration). In other embodiments, the intermediaries may be configured to perform other operations in addition to or instead of optimization, such as routing, caching, etc.

All communication traffic between client 110a and server 170a may traverse intermediaries 130, 150 in the illustrated embodiment of the invention. One or both intermediaries may also handle traffic between client 110a and entities other than server 170a, and/or traffic between server 170a and other entities. In other embodiments, the client and server may also utilize other communication paths that avoid one or both of the intermediaries.

Server 170a possesses at least one valid digital certificate 172 that, among other things, identifies the server and contains the server's public key for use in a PKE (Public Key Encryption) scheme. Server 170*a* also possesses the corresponding private key.

Client 110*a* also possesses one or more valid digital certificates 112 that identify the client and contain public keys of the client, and also possesses corresponding private keys.

Intermediary 150 possesses private keys of one or more Certificate Authorities (CAs) trusted by at least server 170*a*, and possibly client 110*a* as well. In embodiments of the invention, the intermediary may be configured to perform any or all of a certificate authority's functions.

For purposes of describing illustrative embodiments of the invention, client 110*a* executes Lotus Notes and server 170*a* operates a Lotus Domino server, with port encryption (or transport encryption) enabled. At least one of the CAs for which intermediary 150 possesses a private key is able to issue digital certificates to both client 110*a* and server 170*a*. In particular, the CAs may include one or more CAs internal to the organization in which the Notes client(s) and the Domino server operate, and may even operate on server 170*a*.

Other embodiments of the invention may be implemented in environments in which other applications having similar authentication and security schemes are operated.

It may be noted that no special application, utility or plug-in need be installed on clients 110 or servers 170 in order for them to operate with embodiments of the invention described herein, beyond their ability to operate Lotus Notes and Lotus Domino.

U.S. patent application Ser. No. 11/489,414, entitled "Split Termination for Secure Communication Protocols", describes a method for establishing split-terminated communication sessions between client 110 and server 170 that are secured using SSL, TLS or some other appropriate secure communication protocol. In a basic split-terminated secure communication session, a secure communication connection between two endpoints (e.g., client 110*a* and server 170*a*) is replaced by or divided into multiple secure communication sessions involving the two endpoints and one or more intermediate entities (e.g., intermediaries 130, 150).

Described herein are methods for establishing split-terminated communication sessions even when the client and server perform mutual certificate-based authentication prior to generating a session key for securing the client-server connection. In these methods, intermediate devices are able to access the client-server communications and optimize them.

Figure 2:
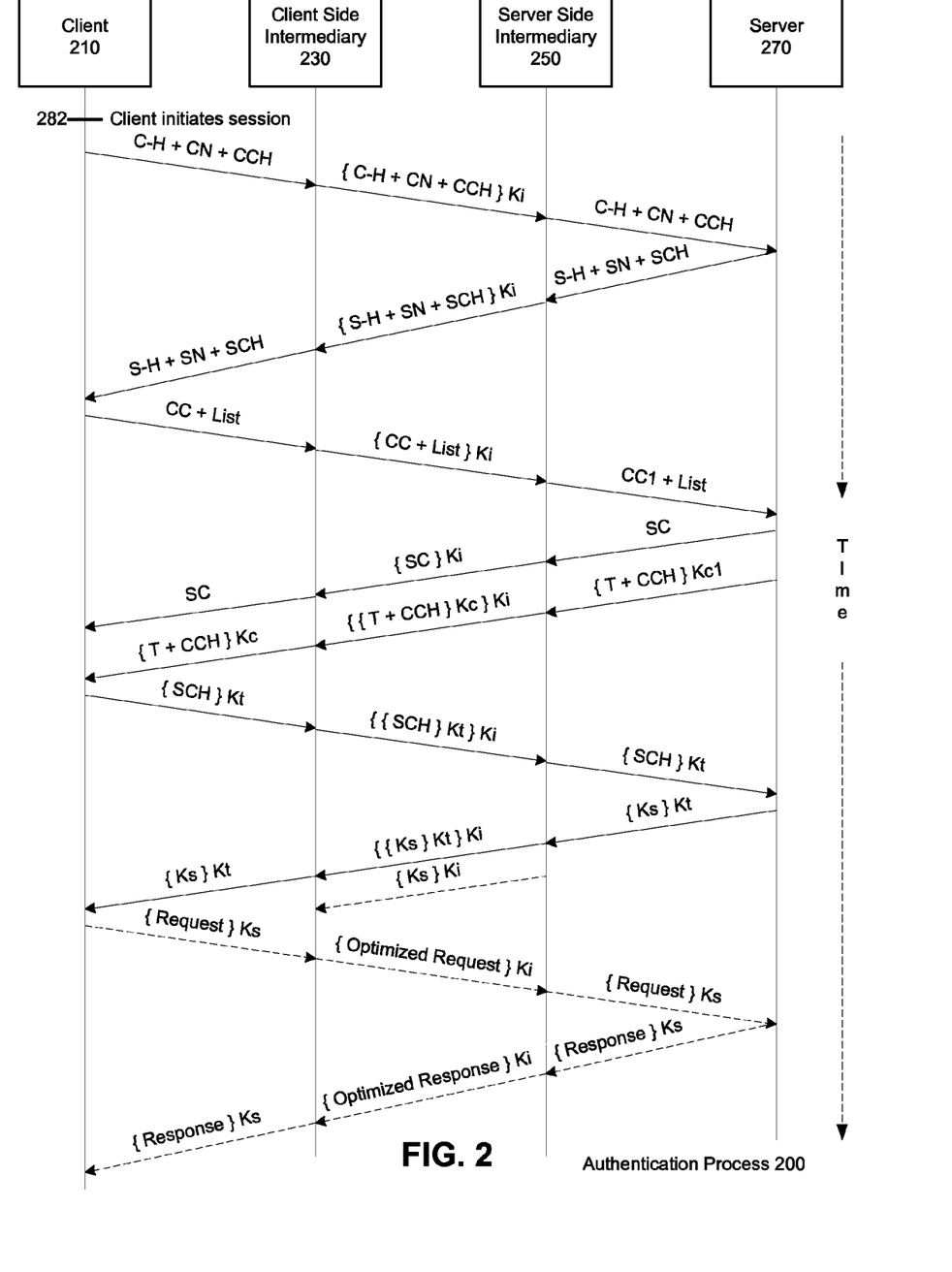
FIG. 2 is a time sequence diagram demonstrating a handshaking process for establishing a split-terminated secure communication session with mutual certificate-based authentication, according to some embodiments of the invention.

FIG. 2 is a time sequence diagram demonstrating a method of split-terminating an end-to-end communication connection in which the communicants perform mutual certificate-based authentication before establishing a session key for their communications, according to some embodiments of the invention.

In one such embodiment, client 210 communicates with client side intermediary (CSI) 230 via a LAN, CSI 230 communicates with server side intermediary (SSI) 250 via a WAN, and SSI 250 communicates with server 270 directly or via another LAN.

Client 210 operates a version of Lotus Notes, while server 270 comprises a Lotus Domino server for working with any number of clients, including client 210. The directed vectors between the client, the server and the intermediaries represent messages involved in authentication process 200.

During or prior to authentication process 200, SSI 250 receives and stores a private cryptographic key of a Certificate Authority (CA) trusted by server 270. For example, the organization that has deployed client 210 and server 270 may maintain a CA for issuing certificates to be used within the Notes environment. That CA's private key (e.g., from its root certificate) may be copied to the server side intermediary.

In some alternative embodiments of the invention, a certificate comprising a public key of the server side intermediary is installed on server 270 to establish the SSI as a trusted CA. This ensures the server will trust certificates signed by server side intermediary 250 without storing a private key of an existing CA on the SSI.

In the illustrated embodiment of the invention, at time sequence 282 the client initiates a secure communication connection with the server. After time sequence 282, or possibly in advance of time sequence 282, CSI 230 and SSI 250 establish a secure channel or tunnel between them, so that communications exchanged across the WAN are protected. In one implementation they employ SSL to establish a symmetric key (with either intermediary acting as client), although in other implementations they may employ a different encryption scheme. A symmetric key used by the intermediaries to encrypt/decrypt messages sent via the tunnel is represented herein as Ki.

When the client initiates the secure connection, it issues an SSL Client-Hello (C-H) message toward the entity with which it wishes to communicate—server 270. The Client-Hello message comprises a name of the client, depicted as CN in FIG. 2. The client name may comprise the client's CN (Common Name) attribute within a computing environment such as that depicted in FIG. 1.

The message also comprises client challenge CCH (e.g., a 16 byte random number), and may also include other information, such as an identifier of the client's organization (e.g., the O or Organization attribute). The absence of curly braces "{" and "}" around the Client-Hello message indicates that the message is sent as clear text.

The Client-Hello message is conveyed to server 270 via CSI 230 and SSI 250. Illustratively, and as reflected in FIG. 2, the message may be encrypted for passage across the WAN that separates the intermediaries, in which case it is represented within curly braces as "{C-H} Ki" to indicate that it is encrypted using the intermediaries' shared key Ki. SSI 250 decrypts the Client-Hello message (with Ki) and forwards it to server 270.

The server responds with a Server-Hello message that includes the server's name SN (which may comprise the server's Common Name attribute), a server challenge SCH (e.g., another 16 byte random number) and/or other information (e.g., the server's organization or O attribute). This message is conveyed to client 210 via SSI 250 and CSI 230, and may be encrypted for passage over the WAN.

The client then transmits a copy of a digital certificate issued to the client by a suitable CA (Certificate Authority), represented as CC (Client Certificate) in FIG. 2, along with a list of CAs that it trusts. Illustratively, the certificate may have been issued by a CA that is internal to an organization comprising both the client and the server, and may or may not have been issued by the CA whose private key has been installed on server side intermediary 250. CSI 230 receives and forward the message comprising CC and the list, and may encrypt it with intermediary key Ki.

At server side intermediary 250, the message is intercepted and the client certificate is verified to ensure the client is who it purports to be. The SSI then generates a new, temporary, substitute digital certificate for the client (CC 1), and signs it using the private CA key it possesses. SSI 250 then forwards to the server a message comprising the new certificate CC1 and the client's list of recognized certifiers.

Certificate CC1 may have been generated before receiving certificate CC if the SSI possesses the necessary client data (e.g., client name), which it may learn by observing the Client-Hello message. For example, the server side intermediary may generate new public/private keys and partially construct CC1 (to include the new public key) before receiving the other client data, at which time the substitute certificate can be completed and signed with the private CA key.

In some embodiments of the invention, certificate CC1 is deleted after authentication process 200 is completed. In other embodiments, a substitute client digital certificate may be reused in a later handshaking process for a different client, by replacing the client name and re-signing the certificate.

The server will follow its normal procedure of verifying the client's certificate, and need not be aware that it is actually verifying a substitute certificate. Because the server side intermediary verified the client's true certificate, there is no danger that a $3^{rd}$ party could masquerade as client 210.

Server 270 now sends toward client 210 a copy of a server digital certificate (SC) issued to the server by one of the certificate authorities identified in the client's list. Because both communicants operate in the Notes environment, there should be at least one certificate authority trusted by both the client and the server, and that CA may reside on the server. The server's certificate is conveyed to the client via the SSI and the CSI.

Sometime after dispatching its digital certificate (possibly after the client has already received SC), server 270 issues to the client a message comprising a ticket (T) and the client's challenge (CCH) for verification. This message is encrypted with the public key extracted from client certificate CC1. That key is represented in FIG. 2 as Kc1.

As one skilled in the art will recognize, ticket T comprises a temporary key (represented here as Kt) that is valid for some period of time to facilitate re-authentication with the server without having to exchange certificates again. In particular, a new session key can be generated using ticket T if it has not yet expired. The intermediaries are also able to generate the new session key because they (or at least the SSI) previously stored the ticket. If the CSI did not receive the ticket, the SSI can generate the session key and migrate it to the CSI.

At SSI 250, the server's message is decrypted with the private key of the temporary client certificate CC1, and ticket T is extracted and may be retained for some or all of its period of validity. The ticket message is then re-encrypted with the public key from original client certificate CC for delivery to client 210.

The server side intermediary may further encrypt the ticket message with the shared intermediary key Ki for passage to CSI 230.

CSI 230 decrypts the communication with Ki and delivers the message to the client, which decrypts it with the corresponding private key of certificate CC. The client retrieves ticket T for storage and possible use in a later abbreviated authentication process, and may examine the client challenge to ensure it matches the challenge originally sent to the server.

After retrieving the ticket, client 210 uses temporary key Kt to encrypt a verification message to the server. This message comprises the server's challenge SCH, and allows the server to verify that it is communicating with the correct entity.

Upon verifying that the client provided the correct challenge, server 270 finally issues session key Ks for the client and server to use to secure their communications. The session key message is encrypted using the key Kt from ticket T, and dispatched toward client 210.

The message is intercepted by SSI 250, and read to retrieve session key Ks. The session key is also forwarded to CSI 230 (encrypted with Ki), for delivery to the client. After retrieving Ks, the SSI migrates the session key to CSI 230 (possibly in the same message in which the session key is forwarded toward the client).

The client may now securely issue communications (e.g., data requests and/or submissions) toward server 270 using the session key. Illustratively, each client request is encrypted using Ks and submitted to CSI 230. The CSI decrypts it using the copy of Ks received from the SSI.

The CSI may then optimize or otherwise manipulate the request, to accelerate it for example, and then encrypt it with Ki before transmitting it to SSI SSI 250. At the server side intermediary, the optimized message is decrypted with Ki, processed and re-encrypted with Ks and delivered to the server. The reverse process is then followed to securely deliver any server response to client 210.

In FIG. 2, the sequence of directed vectors is not meant to indicate exact sequencing of corresponding messages, but rather approximations. Thus, a message received by one entity may not be immediately forwarded, but rather may be processed or manipulated in some manner before the next message in sequence is issued.

The method described above and illustrated in FIG. 2 may also be applied between two servers to enable optimization of their communications. For example, two servers cooperating in a Lotus Notes/Domino cluster may communicate to replicate data or for other purposes. One of the servers may act as a "client" to connect to the other, and the process described above will allow intervening intermediaries to improve the efficiency of their communications.

In some embodiments of the invention, a particular Lotus Domino server parameter may need to be deactivated. That parameter, known as "Check Public Key" determines whether or not the Domino server will determine whether the public key of the client certificate it receives matches that of the most recent certificate it issued to the client (in its role as a Certificate Authority) or the most recent certificate that it knows to have been issued to the client (by some other CA). The default for this parameter is "Off", and therefore most environments require no modification of their operating parameters.

In embodiments of the invention described with reference to FIG. 2, a server issues a message comprising a ticket that can be used to extract a session key from a subsequent server message. In some other embodiments, the ticket or the earlier message itself may comprise a session key, similar to client certificate based authentication in the SSL (Secure Socket Layers) protocol.

Figure 3:
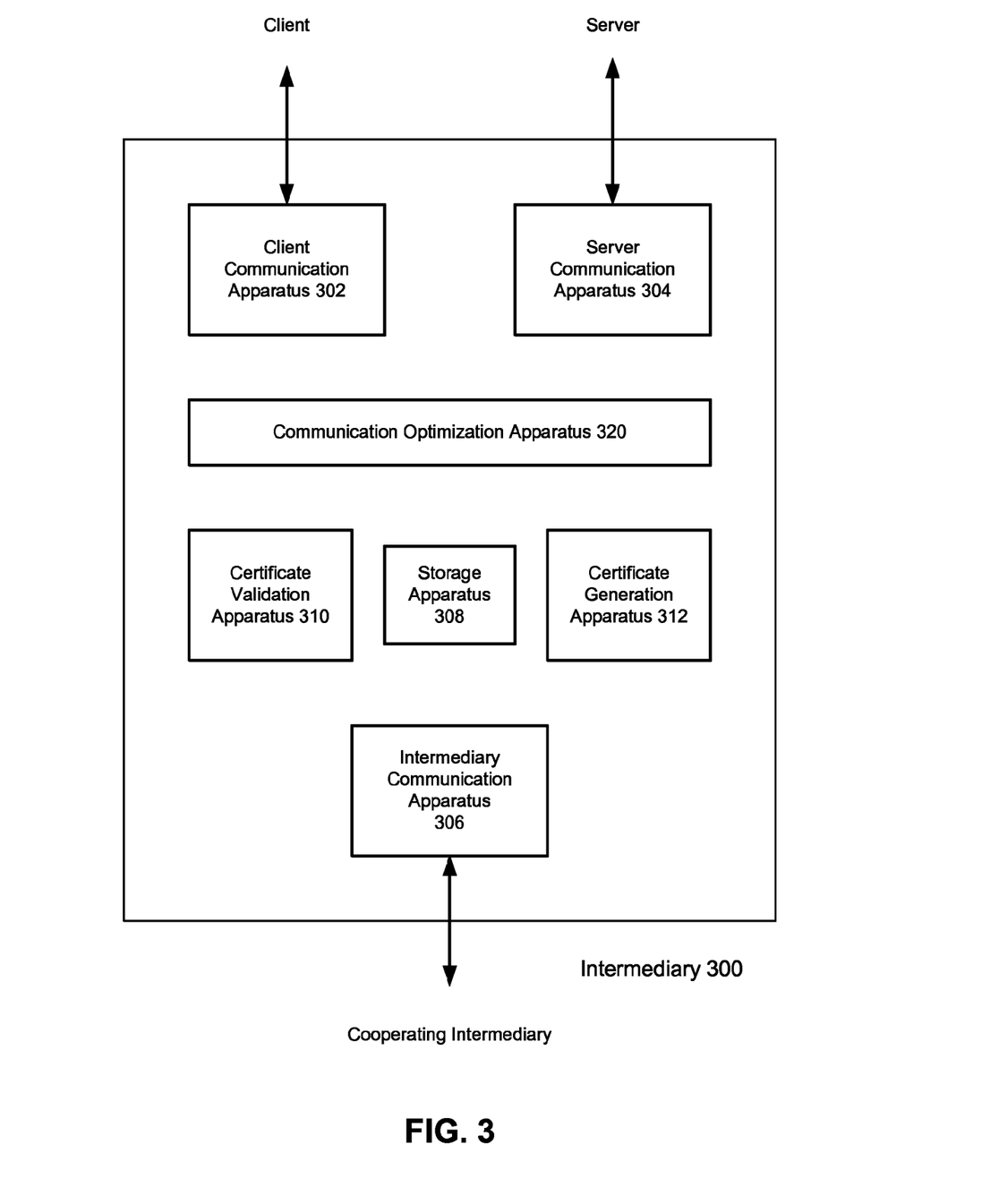
FIG. 3 is a block diagram of apparatus with which mutually authenticated secure communication protocol sessions may be split-terminated, according to some embodiments of the invention.

FIG. 3 is a block diagram of hardware apparatus that may be employed to facilitate establishment of a split-terminated mutually authenticated client-server communication connection, according to some embodiments of the invention.

Intermediary 300 of FIG. 3 comprises communication apparatuses 302, 304 and 306 for communicating with a client, a server and another intermediary, respectively. Any or all of these communication apparatuses may be combined in other embodiments of the invention.

The communication apparatuses are adapted to transmit communications to, and receive communications from, the indicated entities. The communication apparatuses may also be adapted to assemble/extract components of a communication, and/or to encrypt/decrypt a communication as needed.

Intermediary 300 also comprises storage apparatus 308 (e.g., a memory) for temporarily storing various information. Such information may include, but is not limited to, digital certificates received from and/or generated for a client, tickets received from a server, a CA's private key, other encryption/decryption keys, etc.

Certificate validation apparatus 310 is adapted to validate a digital certificate received from a client, to ensure the client is who it appears to be. Apparatus 310 may communicate with an external entity to facilitate such validation, and may therefore invoke one of communication apparatuses 302, 304, 306 or another communication apparatus not depicted in FIG. 3.

Certificate generation apparatus 312 is adapted to generate new public/private key pairs and digital certificates as needed. In particular, apparatus 312 is adapted to generate a substitute digital certificate for a client when the intermediary intercepts the client's original digital certificate during an authentication process.

Communication optimization apparatus 320 is adapted to optimize communications that transit an optimized session with another intermediary. Thus, apparatus 310 may compress (or expand), encrypt (or decrypt), cache or otherwise enhance the efficiency of client-server communications.

Figure 4:
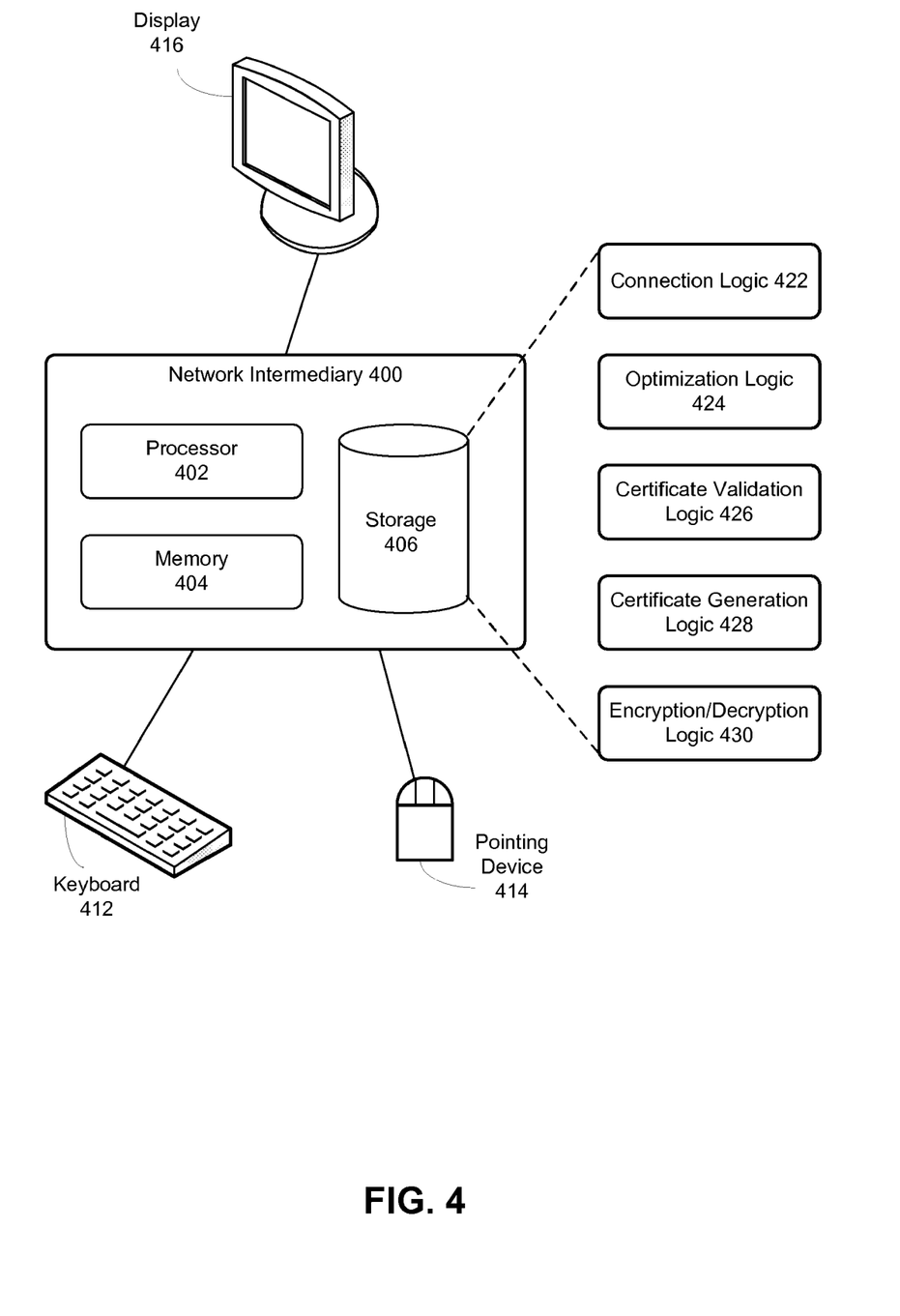
FIG. 4 is a block diagram of a network intermediary with which mutually authenticated secure communication protocol sessions may be split-terminated, according to some embodiments of the invention.

FIG. 4 is a block diagram of a network intermediary that may be employed to facilitate establishment of a secure split-terminated client-server connection with mutual certificate-based authentication, according to some embodiments of the invention.

Network intermediary 400 of FIG. 4 comprises processor 402, memory 404 and storage 406, which may comprise one or more optical and/or magnetic storage components. Network intermediary 400 may be coupled (permanently or transiently) to keyboard 412, pointing device 414 and display 416.

Storage 406 of the network intermediary stores various logic that may be loaded into memory 404 for execution by processor 402. Such logic includes connection logic 422, optimization logic 424 and policies 426.

Connection logic 422 comprises processor-executable instructions for establishing, maintaining and terminating communication sessions. Such sessions may be with other network intermediaries, clients and/or servers.

Optimization logic 424 comprises processor-executable instructions for optimizing a communication. Such optimization may involve replacing all or a portion of the communication with substitute content for transmission to another network intermediary, exchanging substitute content in a communication received from another intermediary for its original content, compressing (or decompressing) content of a communication, etc.

Certificate validation logic 426 comprises processor-executable instructions for validating a digital certificate, such as a client's digital certificate received during an authentication process with a server.

Certificate generation logic 428 comprises processor-executable instructions for generating a digital certificate using a CA's private key. Logic 428 may also comprise instructions for generating new encryption/decryption keys, or such logic may be separate.

Encryption/decryption logic 430 comprises processor-executable instructions for encrypting/decrypting, as needed, communications (or portions of communications) received at or transmitted from intermediary 400.

The environment in which a present embodiment of the invention is executed may incorporate a general-purpose computer or a special-purpose device such as a hand-held computer. Details of such devices (e.g., processor, memory, data storage, display) may be omitted for the sake of clarity.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. The scope of the invention is defined by the appended claims, not the preceding disclosure.

What is claimed is:

1. A method of facilitating split-termination of a secure communication connection between a client computing device and a server computing device that perform mutual authentication, the method comprising, at a first intermediate network device situated in a communication path between the client and the server:
   intercepting a client digital certificate transmitted toward the server by the client;
   generating a substitute digital certificate in a name of the client, wherein said generating comprises:
      constructing a substitute client private key and a substitute client public key; and
      signing the substitute digital certificate with a private key of a certificate authority recognized by the server;
   transmitting the substitute digital certificate to the server;
   intercepting a message addressed to the client and issued by the server after the server receives the substitute digital certificate;
   decrypting the message with a key associated with the substitute digital certificate;
   extracting a ticket from the message;
   re-encrypting the message with a key associated with the client digital certificate;
   forwarding the re-encrypted message toward the client;
   extracting a temporary key from the ticket; and
   using the temporary key to retrieve a session key from a subsequent message issued by the server and addressed to the client.

2. The method of claim 1, further comprising, prior to said generating:
   storing a private key of the certificate authority recognized by the server.

3. The method of claim 2, wherein the client digital certificate was issued by the certificate authority.

4. The method of claim 1, wherein:
the message was encrypted with the substitute client public key.

5. The method of claim 1, further comprising:
storing the ticket to facilitate a subsequent authentication of the client to the server.

6. The method of claim 1, further comprising:
deleting the substitute digital certificate after said retrieving a session key.

7. The method of claim 1, further comprising:
intercepting a second client digital certificate transmitted toward the server by a second client;
altering the substitute digital certificate to include a name of the second client in place of a name of the client;
re-signing the substitute digital certificate with the private key of the certificate authority; and
transmitting the substitute digital certificate to the server.

8. The method of claim 1, further comprising:
storing a public key of the first intermediate network device on the server.

9. The method of claim 8, further comprising:
intercepting a second client digital certificate transmitted toward the server by a second client;
constructing a second substitute client private key and a second substitute client public key;
signing a second substitute digital certificate with a private key of the first intermediate network device; and
transmitting the second substitute digital certificate to the server in place of the second client digital certificate.

10. The method of claim 1, wherein the first intermediate network device is configured to operate with a second intermediate network device to optimize communications between the client and the server, wherein the second intermediate network device is also situated in a communication path between the client and the server.

11. The method of claim 1, further comprising, after said retrieving a session key:
transmitting the session key from the first intermediate network device to a second intermediate network device situated in closer proximity to the client than the first intermediate network device.

12. The method of claim 11, further comprising:
at the second intermediate network device:
receiving a message from the client directed toward the server;
decrypting the message with the session key;
encrypting the message with an intermediary key shared between the first intermediate network device and the second intermediate network device; and
transmitting the message toward the first intermediate network device; and
at the first intermediate network device:
decrypting the message with the shared intermediary key;
encrypting the message with the session key; and
transmitting the message toward the server.

13. The method of claim 12, further comprising:
at the first intermediate network device:
receiving from the server a response directed toward the client;
decrypting the message with the session key;
encrypting the message with the shared intermediary key; and
transmitting the message toward the second intermediate network device; and
at the second intermediate network device:
decrypting the message with the shared intermediary key;
encrypting the message with the session key; and
transmitting the message toward the client.

14. A non-transitory computer-readable medium storing instructions that, when executed by a first intermediate network device, cause the first intermediate network device to perform a method of facilitating split-termination of a secure communication connection between a client computing device and a server computing device that perform mutual authentication, the method comprising:
intercepting a client digital certificate transmitted toward the server by the client;
generating a substitute digital certificate in a name of the client, wherein said generating comprises:
constructing a substitute client private key and a substitute client public key; and signing the substitute digital certificate with a private key of a certificate authority recognized by the server;
transmitting the substitute digital certificate to the server;
intercepting a message addressed to the client and issued by the server after the server receives the substitute digital certificate;
decrypting the message with a key associated with the substitute digital certificate;
extracting a ticket from the message;
re-encrypting the message with a key associated with the client digital certificate;
forwarding the re-encrypted message toward the client;
extracting a temporary key from the ticket; and
using the temporary key to retrieve a session key from a subsequent message issued by the server and addressed to the client.

15. A hardware apparatus situated in a path of communication between a client and server, wherein the client is configured to authenticate the server using a digital certificate associated with the server and the server is configured to authenticate the client using a digital certificate associated with the client, the hardware apparatus comprising:
at least one microprocessor; and
memory storing logic for execution by the at least one processor, the logic including:
first intercept logic for intercepting a client digital certificate transmitted toward the server by the client;
key logic for generating a substitute public key and a substitute private key;
certificate logic for generating a substitute client digital certificate encompassing a name of the client and the substitute public key, wherein generating the substitute client digital certificate comprises:
constructing a substitute client private key and a substitute client public key; and
signing the substitute digital certificate with a private key of a certificate authority recognized by the server;
authentication logic for transmitting the substitute client digital certificate toward the server in place of the client digital certificate;
second intercept logic for intercepting messages addressed to the client by the server; and
encryption/decryption logic for:
decrypting a first intercepted from the server with the substitute private key, to retrieve a temporary key;
re-encrypting the first intercepted message with a public key corresponding to the intercepted client digital certificate, for transmission toward the client; and
decrypting a second intercepted message from the server with the temporary key, to retrieve a client-server session key, wherein the client-server session key is shared between the server, the client, and the hardware apparatus.

16. The hardware apparatus of claim 15, the memory further including:
   storage logic for storing a private key of the certificate authority trusted by the server.

17. The hardware apparatus of claim 15,
   wherein the apparatus does not comprise the certificate authority.

18. The hardware apparatus of claim 15, wherein the apparatus is configured to operate cooperatively with a second apparatus situated in the path of communications to optimize communications between the client and the server.

* * * * *